US009143590B2

(12) United States Patent
Goldman et al.

(10) Patent No.: US 9,143,590 B2
(45) Date of Patent: Sep. 22, 2015

(54) HEADSET BASE WITH DISPLAY AND COMMUNICATIONS BASE

(71) Applicants: Tomasz Goldman, Hellerup (DK);
Claus Tondering, Lyngby (DK);
Henning Toft Schwarz, Horsholm (DK); Bo Schmidt, Kgs. Lyngby (DK);
Stefan Heise, Bronshoj (DK)

(72) Inventors: Tomasz Goldman, Hellerup (DK);
Claus Tondering, Lyngby (DK);
Henning Toft Schwarz, Horsholm (DK); Bo Schmidt, Kgs. Lyngby (DK);
Stefan Heise, Bronshoj (DK)

(73) Assignee: GN Netcom A/S (DK)

( * ) Notice: Subject to any disclaimer, the term of this patent is extended or adjusted under 35 U.S.C. 154(b) by 54 days.

(21) Appl. No.: 14/018,504

(22) Filed: Sep. 5, 2013

(65) Prior Publication Data

US 2014/0140501 A1    May 22, 2014

Related U.S. Application Data

(63) Continuation of application No. 12/815,502, filed on Jun. 15, 2010, now abandoned, which is a continuation-in-part of application No. PCT/DK2009/000014, filed on Jan. 20, 2009.

(51) Int. Cl.
*H04M 1/04* (2006.01)
*H04M 1/60* (2006.01)
*H04M 1/725* (2006.01)

(52) U.S. Cl.
CPC .............. *H04M 1/04* (2013.01); *H04M 1/6066* (2013.01); *H04M 1/7253* (2013.01)

(58) Field of Classification Search
CPC ....... H04M 1/04–1/10; H04M 1/6041–1/6066; H04M 1/72519–1/7253
USPC .......................................... 455/575.1, 575.2
See application file for complete search history.

(56) References Cited

U.S. PATENT DOCUMENTS 4,735,377 A  *  4/1988  Zuehsow ...................... 242/379
5,923,737 A      7/1999  Weishut et al.
(Continued)

FOREIGN PATENT DOCUMENTS

CN         2575906       11/2008
EP         1990982       11/2008
(Continued)

OTHER PUBLICATIONS

Chinese Office Action with English translation for Chinese application 200980154921.0 dated Jun. 5, 2013.
European Search Report for EP Application No. 10164935.8.
GN 9350 Guide for Basic set-up and use, 2006, GN Netcom.
Desktop Electronic Calculator (big digit calculator with tilt head LCD) retrieved on Sep. 25, 2012, located at http://www.amazon.com/Desktop-Electronic-Calculator-digit-calculator/dp/B001GUMF9C/ref=sr_1_1?ie=UTF8&qid=1348612176&sr=8-1&keywords=Desktop+Electronic+Calculator+%28big+digit+calculator+with+tilt+head+LCD%29.

*Primary Examiner* — Gennadiy Tsvey
(74) *Attorney, Agent, or Firm* — Altera Law Group, LLC

(57) ABSTRACT

A headset base unit (2) comprising a base housing (4), a headset holder (5, 38) for holding a headset (3). The headset base unit (2) has control means (9), by means of which an audio channel can be opened between the headset (3) and a selected one of the telecommunication devices (9, 10, 11), and a display unit (39) with a display (6) adapted for displaying device icons (12, 13, 14) representing connected telecommunication devices (9, 10, 11). A further communication system (95) comprising a headset system (1) and a cordless telephone (109). The headset system (109) comprises a wireless headset (3) with a headset transceiver (51) and a headset base unit (2) with headset base transceiver means (27, 28). The handset transceiver (103) and the telephone base transceiver means (100) can be connected by a second radio link (96) according to the first radio standard. The headset base transceiver means (27) and the telephone base transceiver means (100) are adapted to be connected by a third radio link (65) according to the first radio standard, wherein the headset (3) can be used for a telephone call via the first radio link (66) and the third link (65).

8 Claims, 14 Drawing Sheets

(56) References Cited

U.S. PATENT DOCUMENTS

| | | |
|---|---|---|
| 6,941,114 B1 | 9/2005 | Kuo et al. |
| 2004/0224650 A1 | 11/2004 | Hundal et al. |
| 2006/0252470 A1 | 11/2006 | Seshadri et al. |
| 2006/0291045 A1* | 12/2006 | Nakamura et al. ............ 359/384 |
| 2008/0001774 A1 | 1/2008 | Huang et al. |
| 2008/0280561 A1 | 11/2008 | Lin |
| 2009/0010246 A1 | 1/2009 | Grattan et al. |
| 2009/0121680 A1 | 5/2009 | Kikuchi |
| 2010/0062731 A1 | 3/2010 | Ham et al. |
| 2010/0137038 A1 | 6/2010 | Scholz et al. |
| 2010/0162153 A1 | 6/2010 | Lau |
| 2010/0216448 A1 | 8/2010 | Jeon et al. |

FOREIGN PATENT DOCUMENTS

| | | |
|---|---|---|
| WO | WO 00/07345 | 2/2000 |
| WO | WO 2007/143720 | 12/2007 |
| WO | WO 2008/116999 | 10/2008 |

\* cited by examiner

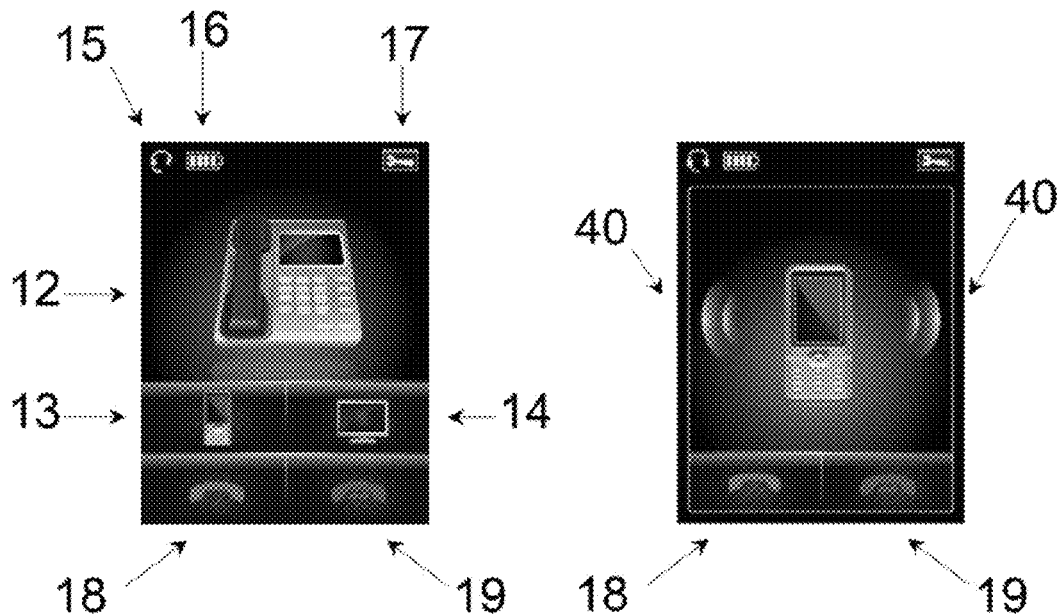
*Fig. 8A)*  *Fig. 8B)*
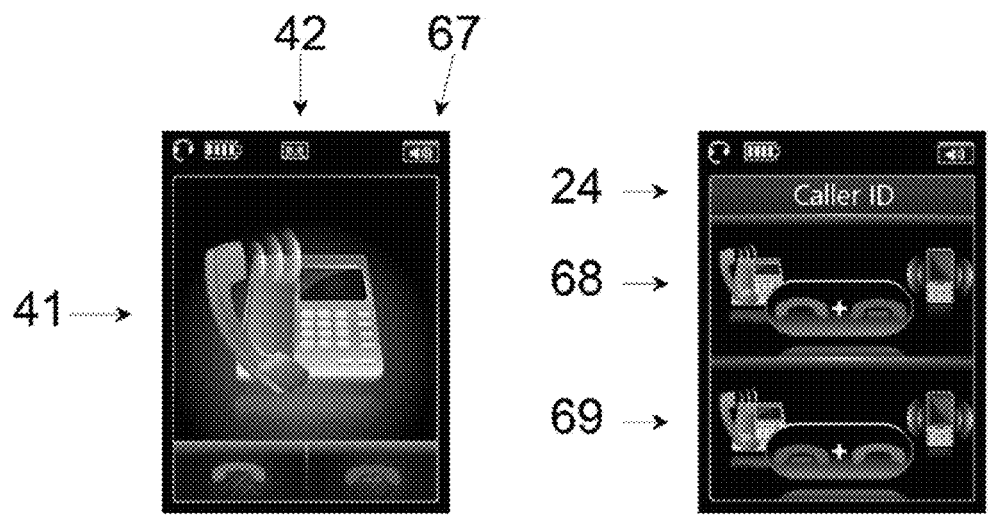
*Fig. 8C)*  *Fig. 8D)*

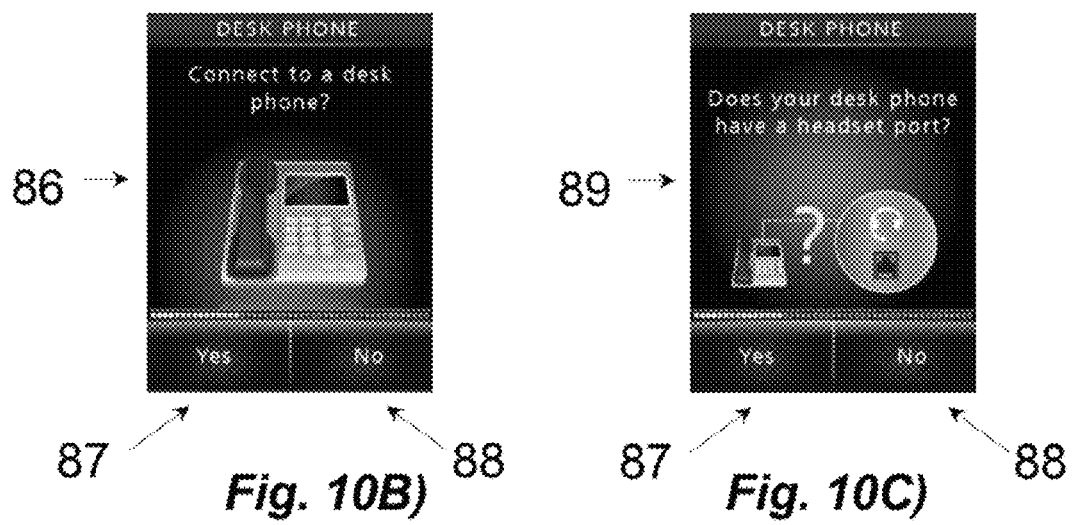
*Fig. 10B)*  *Fig. 10C)*
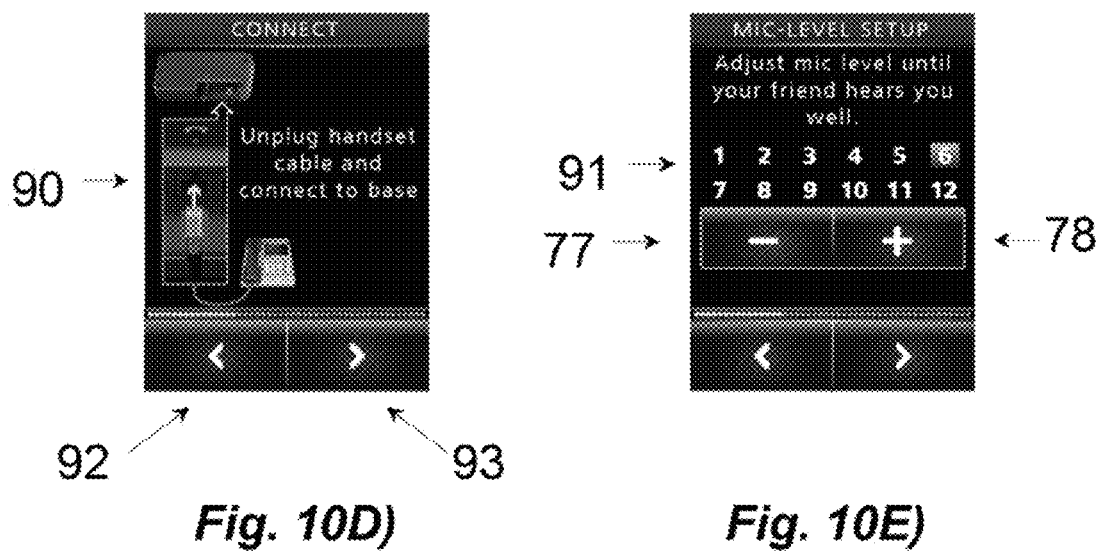
*Fig. 10D)*  *Fig. 10E)*

HEADSET BASE WITH DISPLAY AND COMMUNICATIONS BASE

CROSS-REFERENCE TO RELATED APPLICATIONS

This application is a continuation of patent application Ser. No. 12/815502 filed on 15 Jun. 2010, which is a continuation-in-part of International Application No. PCT/DK2009/000014, filed 20 Jan. 2009.

TECHNICAL FIELD

The invention relates to a headset communications system with a base unit and headset.

BACKGROUND

Wireless headset systems for use in offices and contact centres are well known. They normally comprise a wireless headset with a headset transceiver and a headset base with a corresponding headset base transceiver. The headset transceiver and the headset base transceiver can be connected by a radio link. Wireless headsets following different radio standards are known, but DECT (Digital Enhanced Cordless Telecommunications) and Bluetooth™ are the most prevalent. Bluetooth™ is the prevailing radio standard used by mobile phones and headsets, and DECT is the prevailing standard used by office headsets and their base cradles.

DECT is also the prevailing radio standard for cordless phones, i.e. between the handset and its base. DECT devices can be GAP compatible. GAP is acronym for Generic Access Profile and describes a set of mandatory requirements to allow any conforming DECT Fixed Part (base) to interoperate with any conforming DECT Portable Part (handset or headset) in order to provide basic telephony services.

DECT phones are sometimes sold with more than one handset. The extra handsets are only provided with charging cradles, as the extra handsets communicate with the main headset base. A system with a main base, a main handset and one or more extra handsets also provides the possibility for intercom features, whereby people in a home can communicate with each other via the handsets. An example of a Cordless DECT phone with two extra handsets is Panasonic KX-TG6411.

It is possible to use GAP compatible handsets and headsets with GAP compatible phone bases. Thus, a consumer can buy a GAP compatible DECT headset and connect it with the base station of his GAP compatible DECT phone in order to make hands free telephone calls. In this case, the headset base station functions as a charger only, as the headset transceiver communicates directly with the telephone base transceiver.

Likewise, a headset base unit is a unit, which is arranged between a headset and one or more telecommunication devices, such as a PSTN (Public Switched Telephone Network) desk phone, and IP (Internet Protocol) desk phone, an IP soft phone (installed on a computer) and a mobile phone. The headset base unit comprises a headset holder for holding the headset when not in use. The headset comprises one or two earphones and a microphone. The headset base unit is typically placed on a desk beside a telephone and/or a PC. When the user wants to use the headset, he picks up the headset from the holder and arranges in on his ear or head. The headset can be connected to the headset base unit by a wire or wirelessly. In both cases the user's hands are free for other purposes such as using the computer or handling papers while communicating via the headset.

GN 9350 is an office headset system comprising a headset base unit to be placed on a desk surface and a wireless headset, which can be placed in a headset holder of the headset base unit when not in use. The headset is recharged when placed in the holder. The headset base unit can be simultaneously connected to a desk phone, which can be a PSTN phone or an IP Phone, and a USB socket on a PC. The headset base unit comprises a "telephone mode" button and a "USB mode" button. When the user wants to make or receive a telephone call via the desk phone, he presses the "telephone mode" button. If the user wants to make or receive a call via a soft phone installed on the PC, he presses the "USB mode" button. The buttons are so-called momentary buttons and small indicator LED is arranged at each button. When the button is pressed, the associated LED is turned on, so the user can identify the chosen telecommunication device. This system works well, as the user by means of the LED easily can identify the selected telecommunication terminal.

SUMMARY

In one embodiment there is provided a new and advantageous communication system comprising a phone base, a cordless handset, a headset base and a cordless headset.

The communications system having, in that the headset base transceiver means and the telephone base transceiver means are adapted to be connected by a third radio link according to the first radio standard, wherein the headset can be used for a telephone call via the first radio link and the third link. With such a system, it is possible to connect a headset system to a cordless telephone and still make use of headset base features, such as advanced user interfaces, headset base connectivity, status information indicators etc.

According to another embodiment, also the first radio link follows the first radio standard.

The first radio standard can be the Digital Enhanced Cordless Telecommunications standard (DECT). DECT was developed by European Telecommunications Standards Institute (ETSI).

Preferably, the headset base unit and the telephone base unit are GAP compatible. This ensures an easy exchange of parts of the system. The user can for example buy a new headset system to his existing cordless telephone or vice versa.

The headset base transceiver means may comprise a first headset base transceiver, which is adapted to connect to the headset transceiver, and a second headset base transceiver, which is adapted to connect to the telephone base transceiver means. In this case, there is more freedom in configuring the different transceivers as master or slave.

Preferably, the second headset base transceiver is configured as slave and the telephone transceiver means as master.

According to a preferred embodiment, the headset base unit it is simultaneously connectable to additional telecommunication devices.

Preferably, the headset base unit is adapted to be able to instruct a connected telecommunication device to initiate an outgoing call. Thus, the user does not have to use the connected telecommunication device in order to initiate a call.

The headset base may comprise a base user interface. A great advantage with this is that the user, while wearing the headset, can use the interface while looking at it, which is not the case with a user interface on the headset.

According to a preferred embodiment, the headset base unit comprises a display.

In a particularly preferred embodiment, the display is a touch-screen display, which makes up a user interface.

According to a preferred embodiment, the speaker volume, microphone volume, and speaker equalisation can be adjusted by means of the touch-screen display.

The touch-screen display may be adapted to display a keypad for dialling a telephone number.

The headset base unit may be adapted to store a call list or phone book and show this call list or phone book on the display, such that the user can initiate an outgoing call by selecting a contact from the call list or phone book.

Preferably, the display is adapted to show information about caller identity or callee identity.

In addition, the headset base can be adapted to show information about the charging status of the headset battery.

In another embodiment there is disclosed a more flexible identification system.

The headset base unit according to the invention is characterised in a display unit with a display adapted for displaying device icons representing connected telecommunication devices.

The display gives the advantage that the user easily can identify which telecommunication terminal is connected to the headset base unit. For example, if a desk phone is connected, an icon clearly indicates this. Furthermore, the graphic software can be upgraded for future needs and or changed for different utilities.

According to a preferred embodiment, the headset base unit is simultaneously connectable to more than one telecommunication device. In this case, a device icon for each telecommunication device on the display makes it easy for the user to identify the connected telecommunication devices.

Preferably, the device icons change appearance, when the represented telecommunication device is selected.

According to an embodiment, the display is a touch-screen display. In this case, the numbers of mechanical buttons and pointing devices can be reduced or omitted. This saves manufacturing costs and improves the design possibilities, as the base housing can be designed slim and minimalistic. Thus, the touch-screen display forms, in whole or in part, a user interface of the headset base unit.

Preferably, a telecommunication device can be selected by touching the device icon representing the telecommunication device. For example, if a call is received by the desk phone, the user can easily choose to open an audio channel between the headset base unit and the desk phone by touching the device icon representing the desk phone.

According to a preferred embodiment, one or more of headset speaker volume, microphone volume, and speaker equalisation can be adjusted by means of the touch-screen display.

Preferably, the device icons change appearance in dependence on the call status, such as incoming call, on call and on hold, of the represented telecommunication device. Thus, the user can easily identify the call status of the connected telecommunication devices. It also reduces the number of erroneous actions by the user. If there is an incoming call on a connected PC soft phone, a device icon on the display clearly indicates this, and intuitively the user will receive the call by touching this icon.

According to an embodiment, a caller identity icon is shown when a device icon signals an incoming call. The caller identity icon can show the telephone number or name of the calling party.

According to a preferred embodiment, the headset base unit comprises a first base transceiver for wireless connectivity to a wireless headset comprising a headset transceiver. Such a wireless solution provides more freedom, as the user can walk around in the office and even into another room when talking through the headset. A transceiver is a combined transmitter and receiver with common circuitry. However, a transmitter-receiver with no common circuitry can also be used.

If the headset is wireless, the holder may comprise charging terminals for charging a rechargeable battery of the headset, when the headset is received by the holder.

Preferably, the display is able to show battery status of the headset. The status may be sent from the headset to the headset base unit during use of the headset, or the headset base unit may be updated every time the headset is received by the holder.

In an alternative embodiment, the headset and the base unit are connected by means of a wire. According to an embodiment, the headset base unit is adapted to be able to instruct a connected telecommunication device to initiate an outgoing call. In this case, the user does not need to manipulate the telecommunication device itself.

In a preferred embodiment, the touch-screen display is adapted to display a keypad for dialling a telephone number. In this case, the user dials the number by touching the relevant number icons on the touch-screen display.

In another embodiment, the headset base unit is adapted to store a call list or phone book and show this call list or phone book on the display, wherein the user can initiate an outgoing call by selecting a contact from the call list or phone book. If a touch-screen display is employed, the user can select the contact by simply touching it on the display.

The display device may be hingedly connected to the housing, so that it can be tilted. Then it can be adjusted for the best viewing angle.

According to an embodiment, the headset holder is a part of a headset holder unit, which is an adjustable or releasable part of the headset base unit. In this case, the holder may be adjusted to hold the headset in the most appropriate position or the holder may be replaced by another holder unit, which is adapted for a headset of another type.

According to an embodiment, the headset holder or headset holder unit is rotatable about an essentially vertical axis, when the headset base unit stands on an essentially horizontal surface. This is a simple and effective solution.

The holder unit may be arranged beside the display device.

According to an embodiment, the headset base unit comprises a second transceiver or transmitter-receiver for wireless communication with a telecommunication terminal comprising a corresponding transceiver or transmitter-receiver. The second transceiver could be a Bluetooth transceiver or transmitter-receiver, which is connectable to a mobile phone also comprising a Bluetooth transceiver or transmitter-receiver. The headset base unit according to the invention with a second transceiver or transmitter-receiver may be without a display.

The invention also relates to a headset system comprising a headset base unit and a headset to be held by the headset holder when not in use.

The headset system may be wired or wireless, which means that the connection between the headset base unit and the headset can be wired or wireless.

The disclosure also induces a method of setting up a headset base unit according to claim 1, wherein the display instructs the user to one or more of the following:
- connect the headset base unit to telecommunication devices
- configuring interface wiring between telephone and headset base unit,
- microphone level setup The display instructions can be assisted by voice tags.

The various embodiments can also be combined together into multiple permutations.

BRIEF DESCRIPTION OF THE DRAWINGS

The invention is explained in detail below with reference to the drawing illustrating a preferred embodiment of the invention and in which.

DETAILED DESCRIPTION

At various places in this disclosure the term "means" is used. It is a convenience but not intended to be interpreted under 35 USC sec 112 sixth paragraph as a "means+function" statement. Rather, "means" in this instance refers to the structures stated and equivalents thereof.

Figure 1:
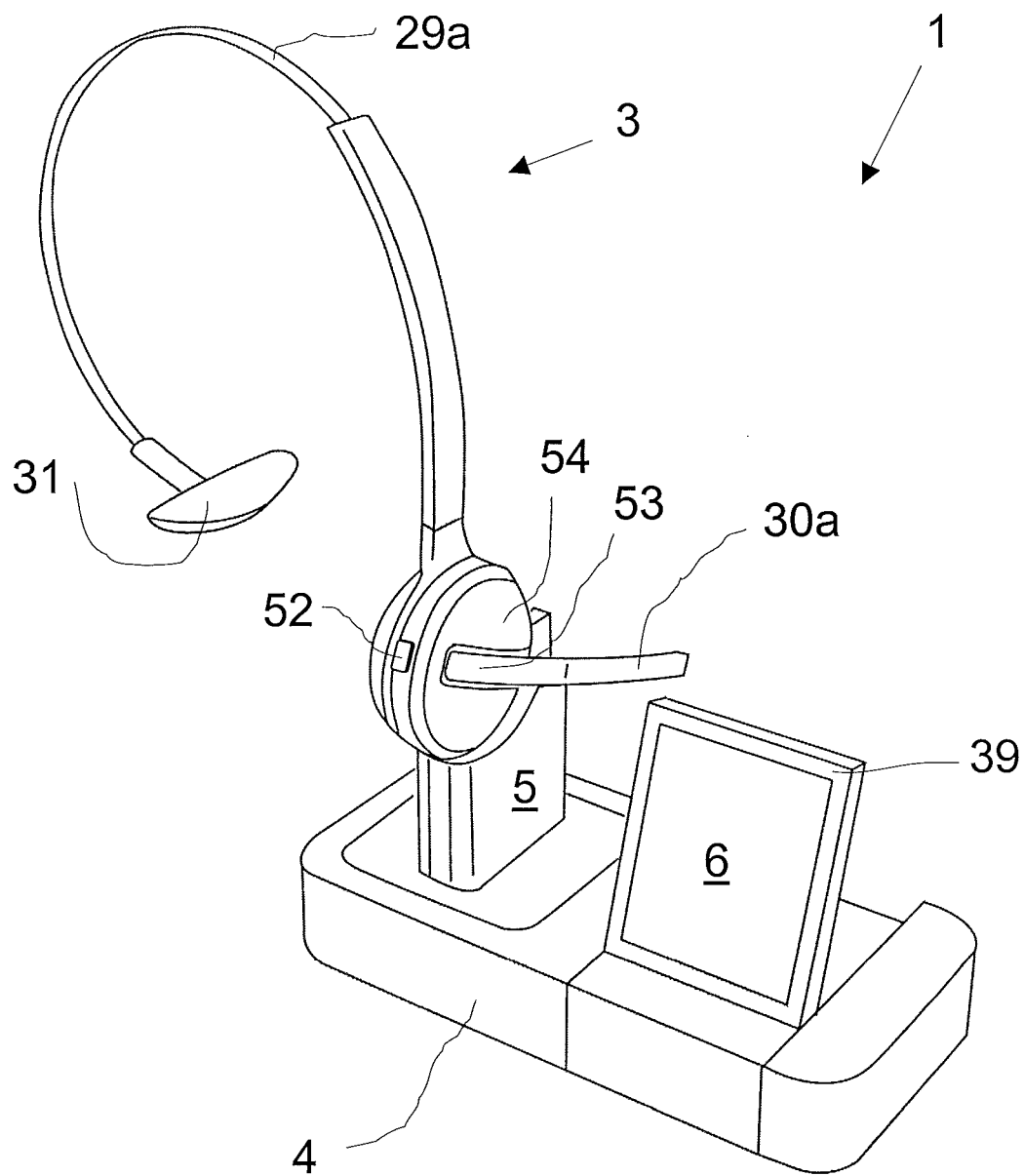
FIG. 1 is a perspective view of a preferred embodiment of a headset system comprising a headset base unit and a headset arranged on a headset holder of the headset base unit, FIG. 2 the headset base unit of the system of FIG. 1, FIG. 3 the headset base unit, where a headset holder unit is released from the remainder of the headset base unit, FIG. 4 the headset system with the headset holder unit is in a second position, FIG. 5 a second embodiment of a headset system, FIG. 6 the headset of the first embodiment, FIG. 7 a diagram showing the headset system according to the invention connected to three different telecommunication devices, FIGS. 8A, 8B, 8C, 8D, 8E, 8F, 8G different views of the display during use of the headset system, FIGS. 9A, 9B, 9C different views of the display during adjustment of call options, and FIGS. 10A, 10B, 10C, 10D, 10E different views of the display during setup of the headset system.

FIG. 1 discloses a headset system 1 according to a preferred embodiment of the invention.

The headset system comprises a headset base unit 2 and a wireless headset 3. The headset base unit 2 comprises a housing 4, a headset holder 5 and a display device 39 with a touch-screen display 6. The display device is a part of or physically connected to the housing 4. When not in use, the headset 3 is arranged on the headset holder 5, as shown in FIG. 1. The headset 3 comprises an earphone housing 54, a microphone arm 30a extending from the earphone housing 54 and a headband 29a, which extends from the earphone housing 54 and comprises a T-shaped endpiece 31 at the opposite free end.

Figure 2:
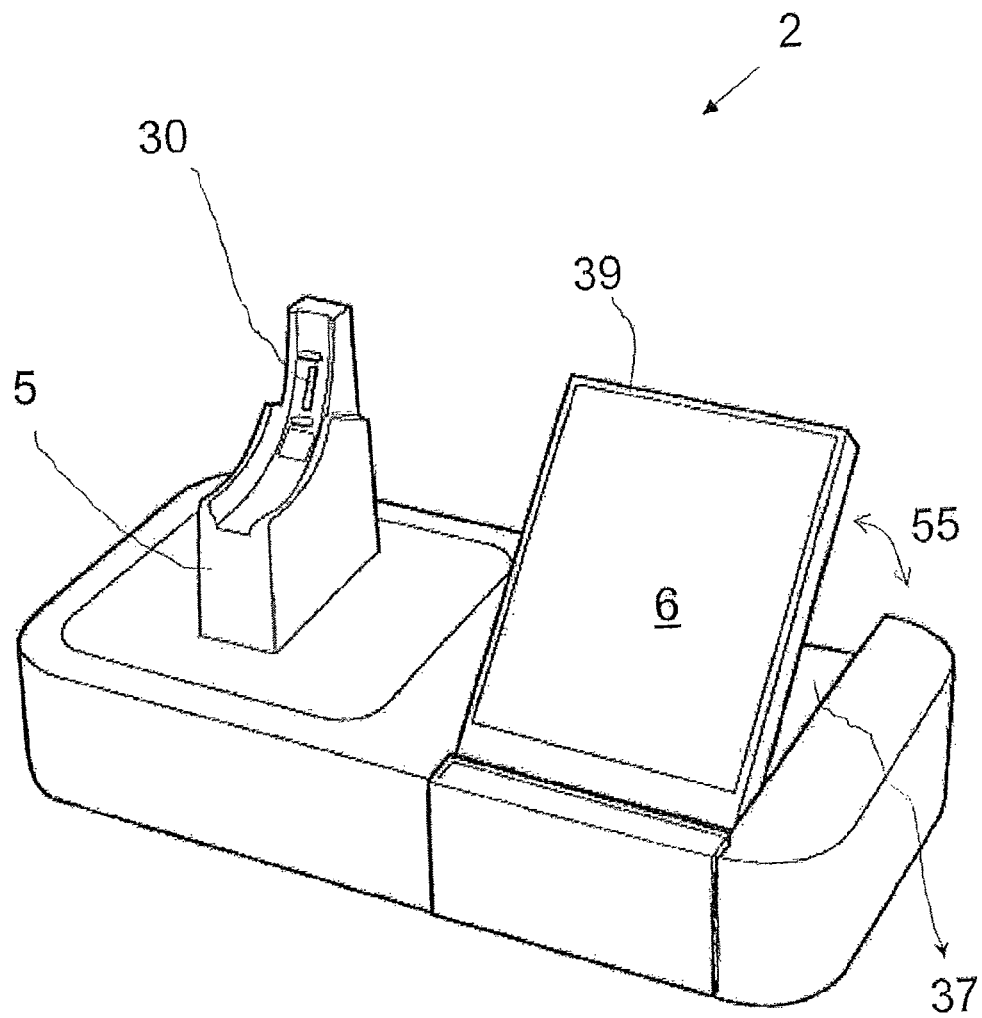

In FIG. 2, the headset 3 is removed from the headset base unit 2. The upper side of the headset holder 5 comprises charging terminals 30 for recharging the battery of the headset 3, when the latter is received by the headset holder 5. The display device 39 is step-less adjustable from 0° to 90° along the arrow 55. This is made possible through a friction hinge.

Thus, the user can adjust the display device 39 to an appropriate viewing angle. In the 0° position (not shown), the display device 29 is received in a recess 37 in the base housing 4, so that it flushes with the upper side of the base housing 4.

In FIG. 2, the display device 39 is positioned at an angle between 0° and 90°.

Figure 3:
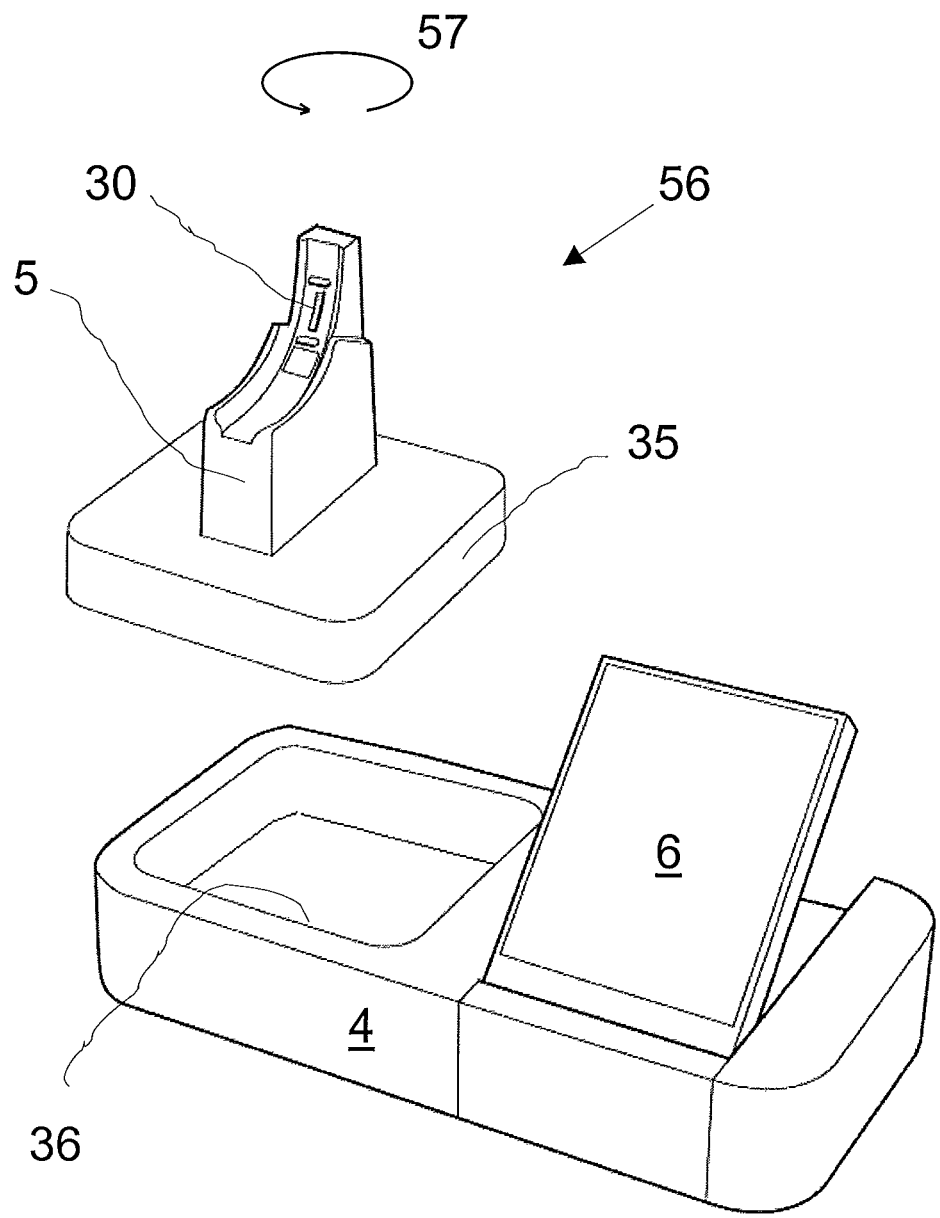
Figure 4:
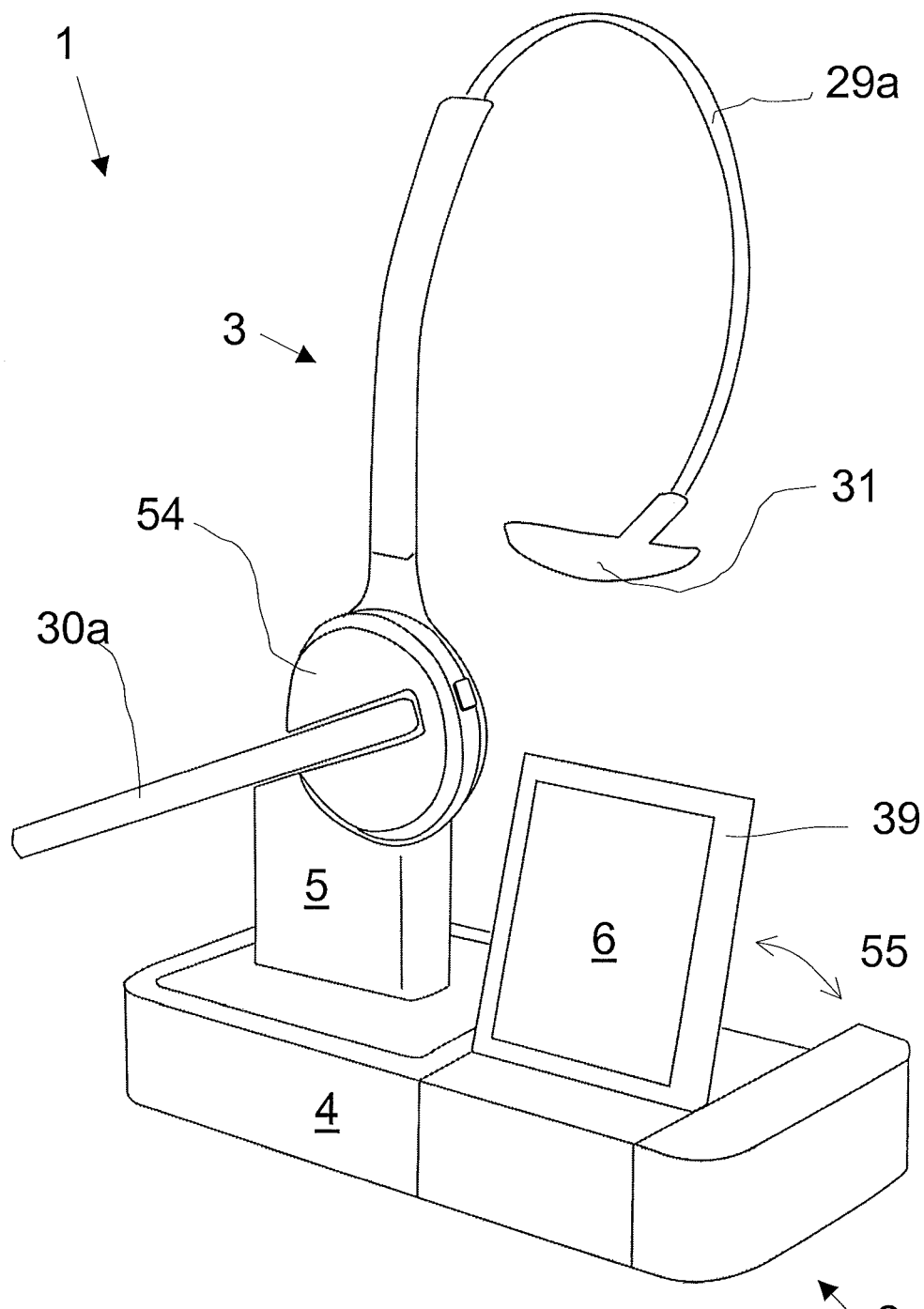

In FIG. 3, it is showed that a holder unit 56 comprising the headset holder 5 and a bottom part 35 can be lifted out of a receiving hole 36 in the base housing 4. By turning the holder unit 56 90° along the arrow 57 about a vertical axis and return it to the receiving hole 36, the headset holder 5 can be adjusted from "right ear position" shown in FIG. 1 to a "left ear position" shown in FIG. 4. In the "right ear position" (FIG. 1), the user can easily grab the headset 3 with his right hand and put it on his head so that the earphone 54 is placed on the right ear. In the "left ear position" (FIG. 4), the user can easily grab the headset 3 with his left hand and arrange it on his head so that the earphone 54 is placed on his left ear. A preferred embodiment would have a symmetric connector which worked in any of 4—90 degree rotated positions, or the connector itself was rotatable. In the case of a symmetric connector, the connections would be mirror imaged 2 or 4 times to allow for 90 or 180 degree rotations. Electrical contact between the headset holder unit 56 and the remainder of the headset base unit 2 can be maintained during adjustment by means of a not shown wire on pluggable connector. Alternatively contact terminals could be provided on bottom part 35 of the holder unit 56 and in the receiving hole 36 so that electrical contact is established in the selected adjustment position.

Figure 5:
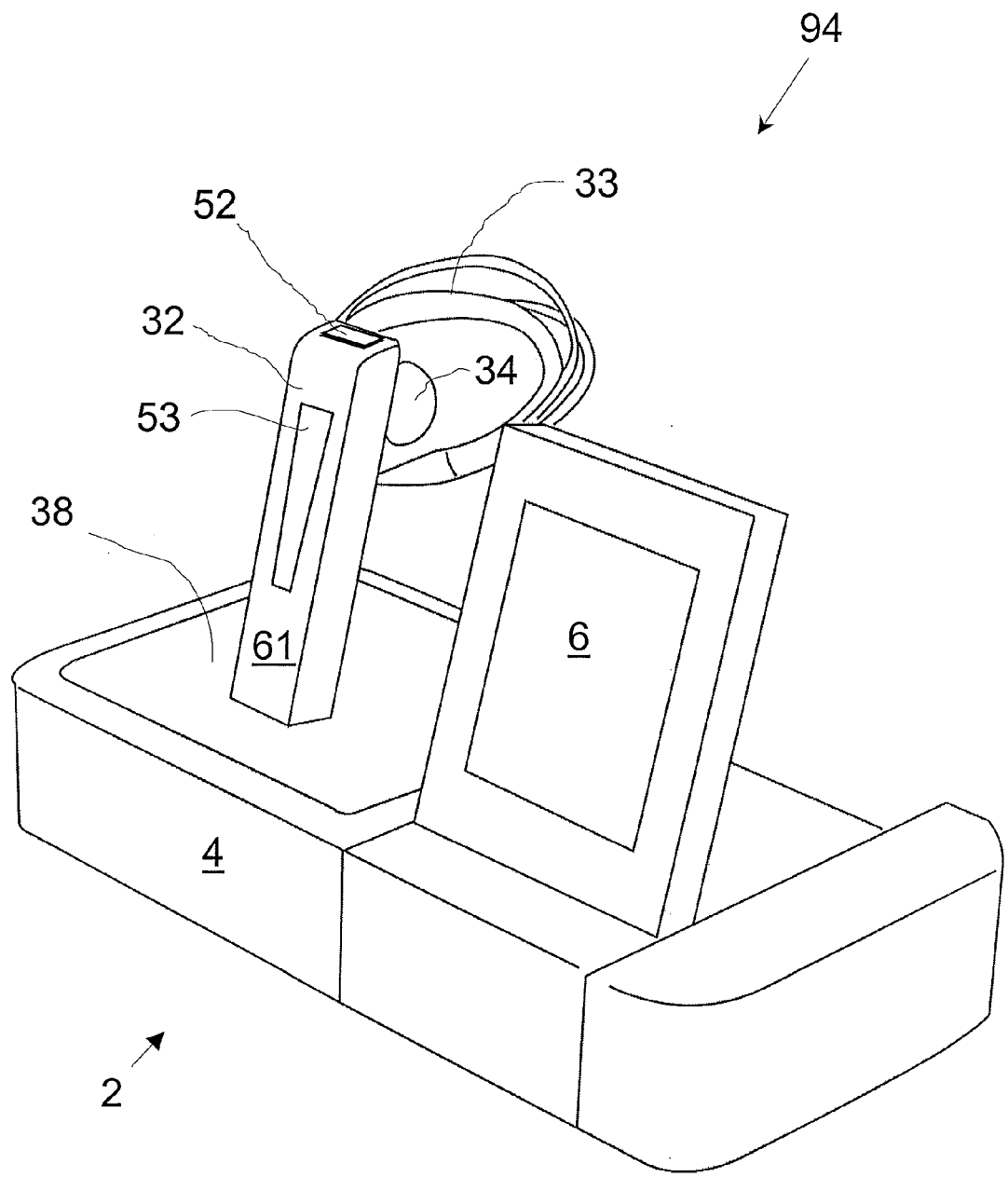

In an alternative embodiment, the headset holder 5 could be rotatably mounted, so that it could be rotated about a vertical axis without being removed from the headset base unit 2. In that case, the connector would allow for rotation and the base 35 and receiving hole 36 would be circular. In the non circular configuration as shown, the preferred embodiment is square so that the based can be inserted in any of 4-90 degree rotated positions. Likewise, base 35 may comprise a plurality of base units configured to be swapped out with different style headset cradles/chargers from the same manufacturer or competitive products so that the base housing 4 can be used for many different headset or cell phone products. FIG. 5 illustrates an alternative swap-out unit.

Figure 6:
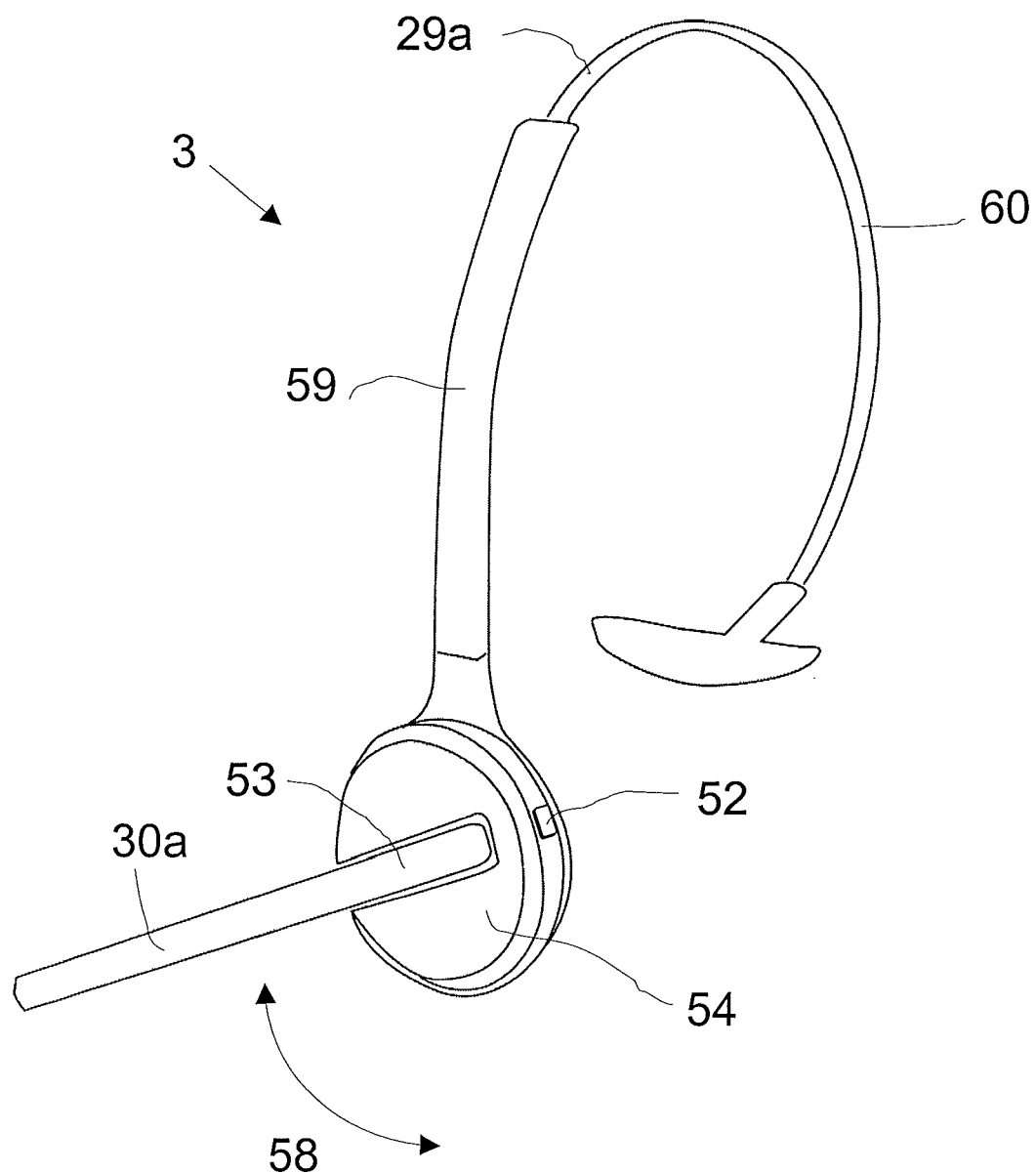

The holder unit 56 can also be replaced by another holder unit. This is advantageous as the headset base unit 2 then can be adapted for use with another headset. In FIG. 5 is shown a second embodiment of the headset system 94 according to the invention. This embodiment differs from the first embodiment by the holder unit 38 being adapted for a different type of wireless headset 32. Thus, the holder unit 38 according to the second embodiment does not comprise an upwardly extending headset holder but simply a receiving hole in the top surface. The headset 32 according to the second embodiment comprises a headset housing 61, an earbud 34 to be inserted into the ear and an ear hook 33 to be arranged around the outer ear of the user. The user interface of the headset 32 comprises a multi-function button 52 and an elongate volume touch button 53. The user can inter alia receive and end calls by pressing the multi-function button 52 and adjust the headset volume by sliding a finger along the volume button 53. Thus, the user turns the volume up by sliding the finger in one direction and turns the volume down by sliding the finger in the opposite direction. In this embodiment, the charging connection in the base 38 engages with the headset 61 which has an opening at its distal end which received a charging contact. This opening can operate as a charging port and microphone passage way (ie a passageway into a chamber housing the microphone, so that the port performs two functions FIG. 6 discloses the headset 3 according to the first embodiment. As indicated with the arrow 58, the microphone arm 30a can be rotated about an axis essentially perpendicular to the large outer surface of the earphone 54 in order to point it in the direction of the user's mouth and to adjust the headset 3 from left ear use to right ear use and vice versa. In FIG. 6, the headset 3 is adjusted to left ear use. The headband 29a comprises a first headband part 59 and a second headband part 60. The second headband 60 part is telescopically received in the first headband part 59, so that the length of the headband 29a can be adjusted to the size of the user's head. On the outer side of the microphone arm and within the outer boundary of the earphone 54, the headset 3 comprises an elongate volume touch button 53. The user can adjust the speaker volume by sliding the finger in the lengthwise direction of the touch button 53 as explained in connection with the second embodiment. The circumferential surface of the earphone 54 comprises a multi-function button 52 for inter alia receiving and ending calls.

Figure 7:
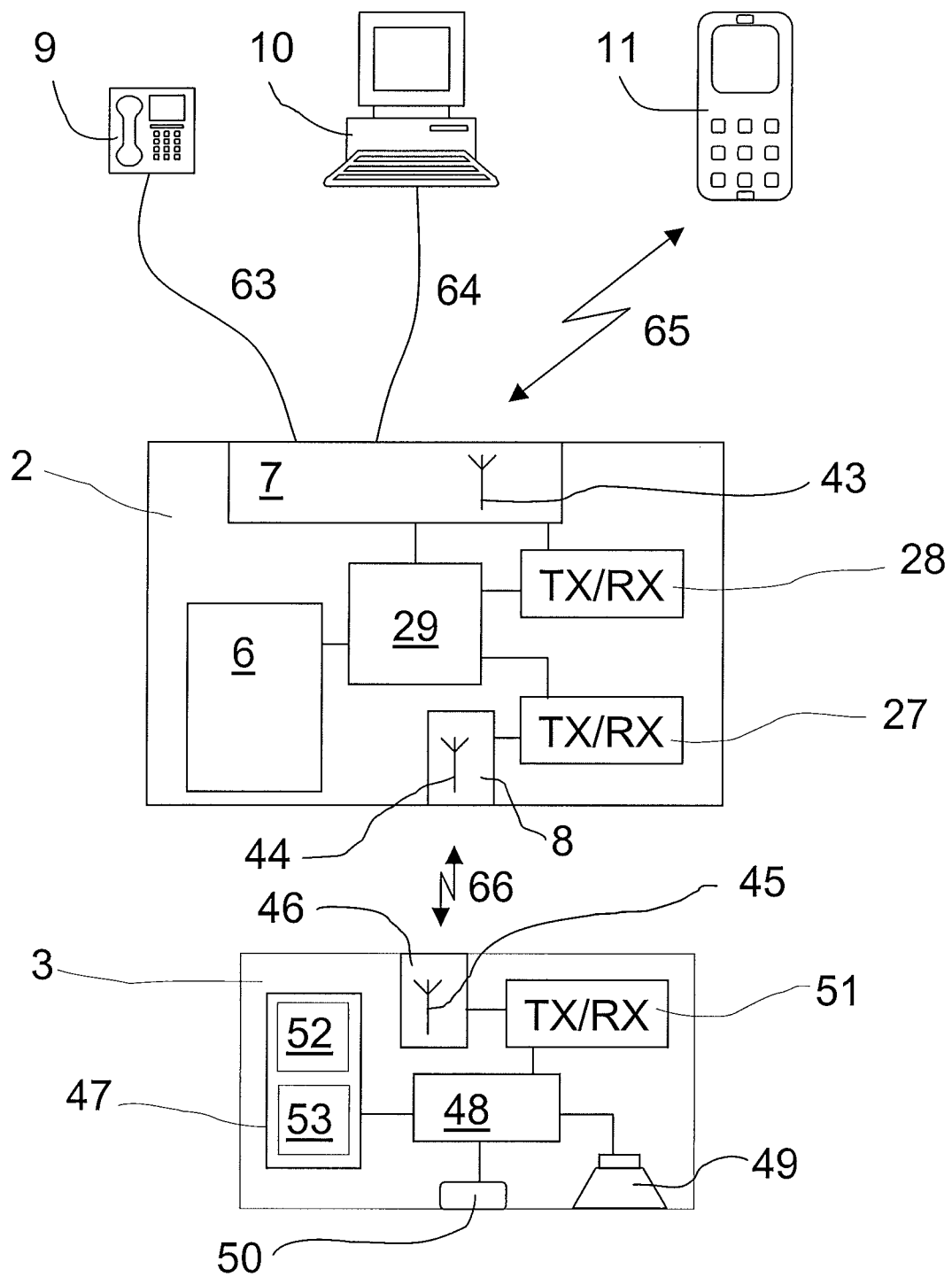

FIG. 7 is a diagram showing how a headset system according to the invention can be connected to a number of telecommunication terminals. The headset base unit 2 comprises a base processor 29, a first connection device 7, a second connection device 8, a first transceiver 27, a second transceiver 28 and a touch screen display 6. The headset base unit 2 is by means of the first connection device 7 connected to a desk phone (PSTN) 9, a PC 10 and a mobile phone 11. The desk phone 9 and the PC 10 are connected by wires 63, 64 to the connection device 7. The wire between PC 10 and the base unit 2 is a USB cable 64. The first connection device 7 also comprises an antenna 43 by means of which a wireless connection 65 to the mobile phone 11 is established. This wireless connection is established by means of the second transceiver 28 and a corresponding transceiver (not shown) in the mobile phone. The wireless connection follows the Bluetooth standard, which means that the second transceiver 28 is a Bluetooth transceiver. However, other standards such as DECT could be utilized. The headset base unit comprises a speaker (not shown in FIG. 7) for generating an audible feedback to the user when operating the touch display. The speaker will also be used to signal an incoming soft phone call.

The second connection device 8 also comprises an antenna 44. A wireless connection 66 between the headset base unit 2 and the headset 3 is established by means of the first transceiver 27 and the antenna 44. The user interface of the headset base 2 comprises the touch screen display 6, which will be described later in detail.

The headset 3 comprises a headset processor 48, a headset connection device 46 with an antenna 45, a headset transceiver 51, a speaker 49 a microphone 50 and a user interface 47. The user interface 47 comprises the multi-function 52 button and the touch volume button 53. The wireless connection 66 between the headset 3 and the headset base unit 2 follows the DECT standard. However, other standards, such as Bluetooth could be used. If Bluetooth is used, the headset 3 could be simultaneously connected to another Bluetooth device, such as the mobile phone 11. The headset shown in FIG. 3 is especially suitable for such a solution, as it is compact and easy to carry in a pocket or bag.

FIG. 8 shows different views of the touch screen display during use of the headset system according to the invention. A touch screen display normally comprises a flat screen display, which is based on LCD, TFT, OLED or other technology and is covered with a transparent touch panel. The touch panel is normally a so-called capacitive or resistive panel. However, other touch panel technologies can be applied. The touch screen display can show different areas, "widgets" or icons, the user can touch in order to control the headset system. In the following, the display 6 is shown for typical situations during use of a headset system according to the invention connected to a desk phone, a PC and a mobile phone.

FIG. 8a) "NORMAL IDLE SITUATION"

In the idle mode situation shown in FIG. 8a), the headset is in idle mode, i.e. there are no active calls. The upper area of the screen is called the "status bar" and comprises a headset icon 15, a battery level icon 16 and a setup icon 17 represented by a small wrench. The headset icon 15 indicates that the headset and the headset base unit are connected. The battery level icon 17 indicates the battery level of the rechargeable battery of the headset. The large icon 12 showing a desk phone with the handset in the cradle is named the target phone icon 12. An outgoing call made from the headset or the headset base unit is made from the telecommunication device selected as "target phone". Below the large "target phone" icon 12 there is a "button stack" with two smaller icons: a mobile phone icon 13 and a PC icon 14: These icons indicate that these telecommunication devices are also connected to the headset base unit. If the user touches the mobile phone icon 13, the target phone icon 12 changes from a desk phone icon to a mobile phone icon, while a smaller desk phone icon will appear in the button stack. In the lower part of the screen, there are a first handset icon 18 and a second handset icon 19, which are used for receiving and ending calls. It does not appear form the drawing, but the first handset icon 18 is green and the second handset 19 icon is red.

FIG. 8b) "Ringing"

In the ringing situation shown in FIG. 8b), there is an incoming call on the mobile phone, which is indicated by an incoming call icon 40 with animated symbols representing sound waves. Thus, the user's attention is drawn to the display. If the user wants to receive the call, he touches the first handset icon 18, and if he wants to reject the call, he touches the second handset icon 19.

FIG. 8c) "On Call"

FIG. 8c) disclose the screen when there is an active call on the desk phone. The active call is indicted by an on call icon 41 showing a sound wave symbol at the speaker of the lifted handset. During an active call, the setup icon 17 has changed to a call option icon 67, represented by a small speaker with a sound wave symbol. By touching this icon, the user gets access to various call adjustments shown in FIG. 9. A "recording" icon 42 shown in the status bar indicates that a call via the PC soft phone is recorded on the PC. However, there could also be a recording function built into the headset base unit 2, so that calls through any of the connected telecommunication devices could be recorded.

FIG. 8d) "Call Collision"

FIG. 8d) discloses what is called a "call collision scenario". There is an active call on the desk phone and an incoming call on the mobile phone. The caller ID 24 of the caller on the mobile phone is shown on the screen just below the status bar. The caller ID is normally a phone number or the name of the calling party. The user now has two options represented by a first call collision icon 68 and a second call collision icon 69. If he touches the first icon 68, he rejects the incoming call on the mobile phone and continues the call on the desk phone. If he touches the second icon 69, he ends the call on the desk phone and receives the incoming call on the mobile phone.

Figure 8E:
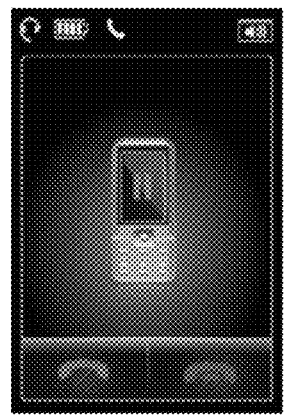

FIG. 8e) "On Call/Hold"

In FIG. 8e) a call on the mobile phone is put on hold, which is indicated by the on hold icon 20. By simply touching the on hold icon 20, the user can make the call active again. By touching the icon representing the active call (see FIG. 8c)), the user can put the call on hold again.

Figure 8F:
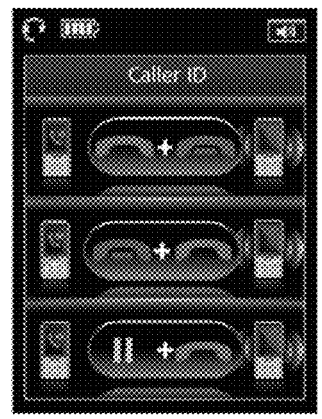

FIG. 8f) "On Call/Incoming Call On Same Line"

In FIG. 8f), the user has an active call on the mobile phone while there is an incoming call on the same phone. He now has three options represented by a first incoming call icon 21, a second incoming call icon 22 and a third incoming call icon 23. If he selects the first icon 21, he continues the active call and rejects the incoming call. If he selects the second icon 22, he ends the active call and receives the incoming call. If he selects the third icon 23, he puts the active call on hold and receives the incoming call.

Figure 8G:
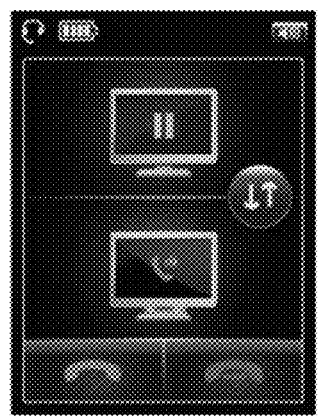

FIG. 8g) "N-Way Call"

In FIG. 8g), the user has a call on hold on the PC soft phone, represented by the on hold icon 25, and an active call on the PC soft phone, represented by the on call icon 26. Between these two icons 25, 26 there is a swap icon 62. The user can swap between the two calls, i.e. put the active call on hold and vice versa, by touching the swap icon 62.

Figure 9A:
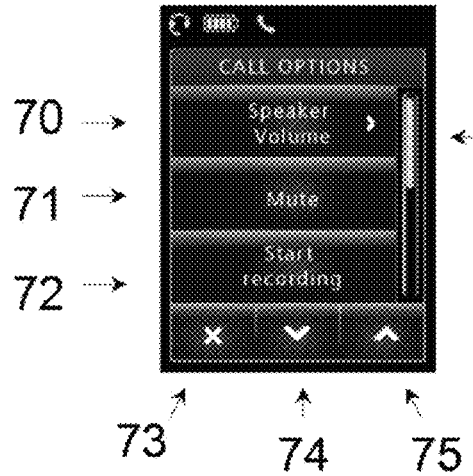
Figure 9B:
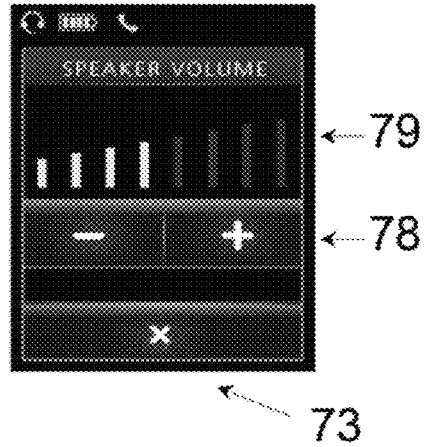

FIG. 9 shows how different call options can be adjusted by means of the touch screen. If the user touches the call options icon 67 (see FIG. 8c)), the call options screen shown in FIG. 9a) appears. The call options screen comprises a call options menu with a speaker volume icon 70, a mute icon 71 and a start recording icon 72. The screen also comprises a scroll down icon 74, a scroll up icon 75 and an exit icon 73 in the lower end of the screen and a scroll bar 76 in the right side of the screen. Further menu icons, such as "tone setting", becomes visible by upwards and downwards scrolling by means of the scroll down icon 74 and the scroll up icon 75. The scroll bar 76 indicates which part of the menu that is visible. Alternatively or additionally, the user may scroll by sliding the finger in the direction of the scroll bar 76. If the user touches the exit button 73, the call options menu is left. A selection of the speaker volume icon 70 will be explained below in connection with FIG. 9b). If the user touches the mute icon 71, the headset microphone is muted. If the user touches the start recording icon 72 all communication is sent by means of the USB cable 64 to the PC 10 and recorded by means of appropriate software. The software can be set to stop recording at the end of a call, or just pause recording between calls.

If the user selects the speaker volume icon 70, the screen shown in FIG. 9b) appears. The screen comprises a speaker meter icon 79 indicating the speaker level, a first adjustment icon 77 with a minus character and a second adjustment icon 78 with a plus character. The user can turn the speaker volume down by touching the first adjustment icon 77 and up by touching the second adjustment icon 78. The speaker meter icon 79 has eight levels and in FIG. 9b), speaker level four is selected. The speed or the number of steps, speaker volume is adjusted by touching adjustment icons 77, 78 may depend on how long the user touches them. In an alternative embodiment, the adjustment make take place by sliding the finger across the touch screen display 6, so that the speaker volume is adjusted upwards, when by sliding the finger in a first direction and downwards by sliding the finger in the opposite direction. The headset base unit may be adapted to remember the last volume setting for each connected telecommunication device and report the volume setting by sending control signals to the headset when a telecommunication device is selected. Thus, the volume is separately set for the desk phone, the soft phone and mobile phone. The user can leave the speaker volume screen by touching the exit icon 73.

Figure 9C:
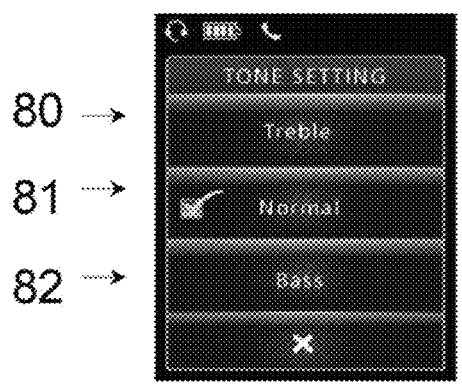

In FIG. 9c), the user has selected "tone setting" (equalisation) from the call options menu. Here the user can select the sound from the headset speaker to be one of three different types represented by a treble icon 80, a normal icon 81 and a bass icon 82. If he selects the treble icon 80, the sound in the treble area will be accentuated, and if he selects the bass icon 82, the sound in the bass area will be accentuated. The normal icon 81 selects a neutral sound. Preferably, the speaker volume, microphone muting and speaker tone setting takes place in the headset, which means that control signals for adjusting the settings are sent from the headset base unit to the headset. The headset sends status signals to the headset base unit about the settings, so that the display shows the correct levels.

Some of these adjustments can also be carried by means of the headset user interface. It is especially advantageous, if the headset speaker volume can be adjusted by the headset user interface. Thus, the headset volume button 53 shown in FIGS. 5 and 6 is used for adjusting the headset speaker volume, while status signals simultaneously is sent to the headset base unit in order to update the display. In this case, it is optional for the user whether he wants to make audio adjustments by means of the headset user interface or by means of the base user interface. If the user is away from the headset, he will use the headset user interface. If he sits at his desk, he may prefer to use the base user interface.

Alternatively, the adjustments take place in the headset base, in which case control signals are sent from the headset to the headset base in order to adjust the audio settings.

In all cases, status or signals are exchanged between the headset and the base, so that the status information shown on the display of the headset base unit is synchronized with the actual sound setting.

Figure 10A:
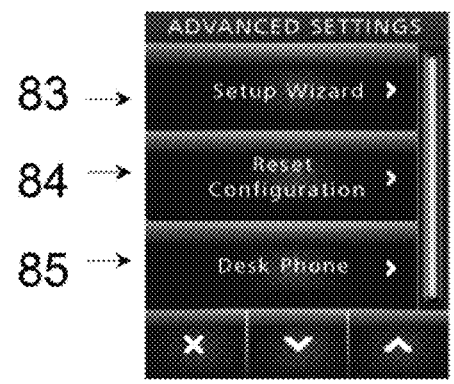

FIG. 10 discloses different views of the display during setup of the headset system according to the invention. If the user touches the setup icon 17 (see FIG. 8a)), the screen shown in FIG. 10a) appears. This screen comprises an advanced settings menu with a setup wizard icon 83, a reset configuration icon 84 and a desk phone icon 85. If the user wants to use the setup wizard, he touches the setup wizard icon 83 and the display 6 guides him through a setup. During the setup, a "connect to a desk phone icon" 86 appears as shown in FIG. 10b). If the user wants to connect the headset base unit to a desk phone, he touches the "yes icon" 87, otherwise the "no icon" 88. If he touches the "yes icon" 87, the screen shown in FIG. 10c) appears. Here, the user is asked with the question icon 89: "Does your desk phone have a headset port?". If the user touches the "no icon" 88, the screen shown in FIG. 10d) appears. Here the user is instructed by the instruction icon 90 to unplug the handset cable and connect it to the headset base unit. Display graphics illustrate how to do this. The user can access further setup steps by touching the "next icon" 93 or return to the previous step by touching the "back icon" 92. Further steps guiding the user to a complete cable connection are not shown here. In FIG. 10e) the user is guided through adjustment of the microphone level by means of a microphone level icon 91, which shows twelve levels. Before this screen, the user is instructed to call a friend. The user touches the "adjustment icons" 77, 78 until a desired microphone level is obtained. Of course, FIG. 10 only show a few setup screens, as several other not shown screens guides the user to setup the headset base unit with other telecommunication devices, such as a mobile phone and a PC soft phone.

The invention also covers embodiments, where more than one telecommunication device of the same type, for example two or three desk phones, can be connected to the same headset base unit. In such a situation, it would be possible to name the devices such as "desk phone 1", "desk phone 2" or "local desk phone", "external desk phone".

The display 6, whether it is a touch screen display or not, may also be used for displaying SMS messages, news feeds, e-mail's etc. For example, SMS messages received by a connected mobile phone may be forwarded to the headset base unit and shown on the display. Another example is e-mails received by a connected PC, which are forwarded to the headset base unit and shown on the display.

A wireless headset system is described in detail here. However, the invention also relates to wired solutions, where the headset and the headset base unit are interconnected by a wire.

Figure 11:
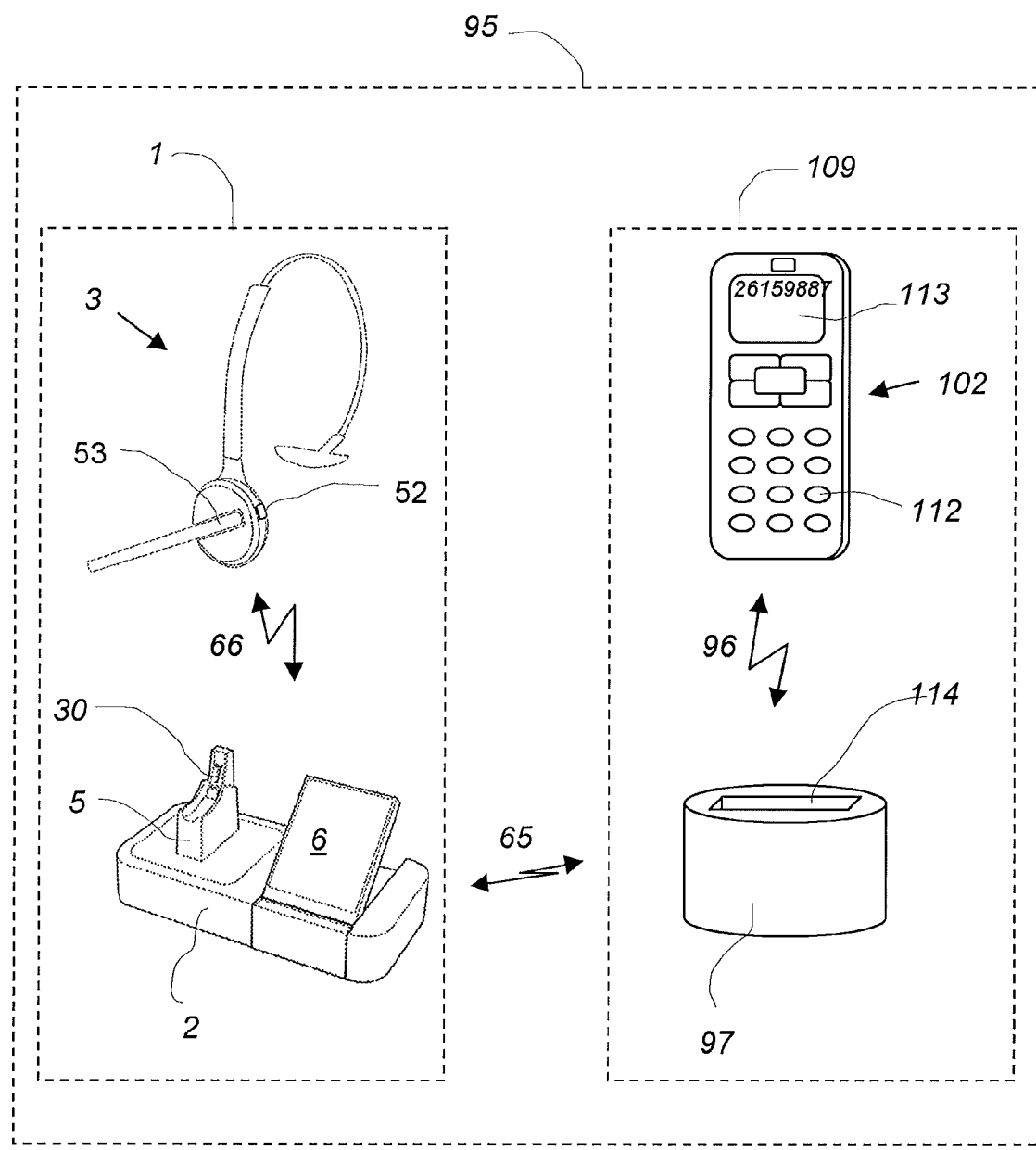
FIG. 11 is a perspective view of a general communication system.

FIG. 11 is showing a communication system 95 according to the invention. The communication system 95 comprises a cordless headset system 1 and a cordless telephone 109. It should be noted, that the terms cordless and wireless used here has the same meaning and are interchangeable. The cordless headset system 1 comprises a headset 3 and a headset base unit 2, while the cordless telephone 109 comprises a handset 102 and a telephone base unit 97. The headset 3 comprises a multi-function button 52 for inter alia receiving and ending calls and an elongate volume touch button 53. The headset base unit 2 comprises a headset holder 5 with charging terminals 30. When the headset 3 is received by the headset holder 5 the charging terminals 30 contacts corresponding not-shown terminals on the headset and charges an internal battery of the headset 3. The headset base unit 2 further comprises a touch-screen display 6, which functions as a user-interface, by means of which the user can adjust settings and initiate or accept calls. The telephone base unit 97 comprises a handset holder 114, which can receive the handset 102 and recharge an internal battery of the handset 102 via not-shown charging terminals in the handset holder 114 and on the handset 102. The handset 102 comprises a display 113 and a user-interface in the form of inter alia buttons 112.

Both the headset system 1 and the telephone 109 are GAP compatible DECT systems, whereby they can communicate with each other. The headset 3 and the headset base unit 2 communicate with each other via a radio link 66 according to the DECT standard.

The handset 102 and the telephone base unit 97 also communicate via a radio link 96 according to the DECT standard. Finally, the headset base unit 2 and the telephone base unit 97 communicate via a radio link 65 according to the DECT standard.

Figure 12:
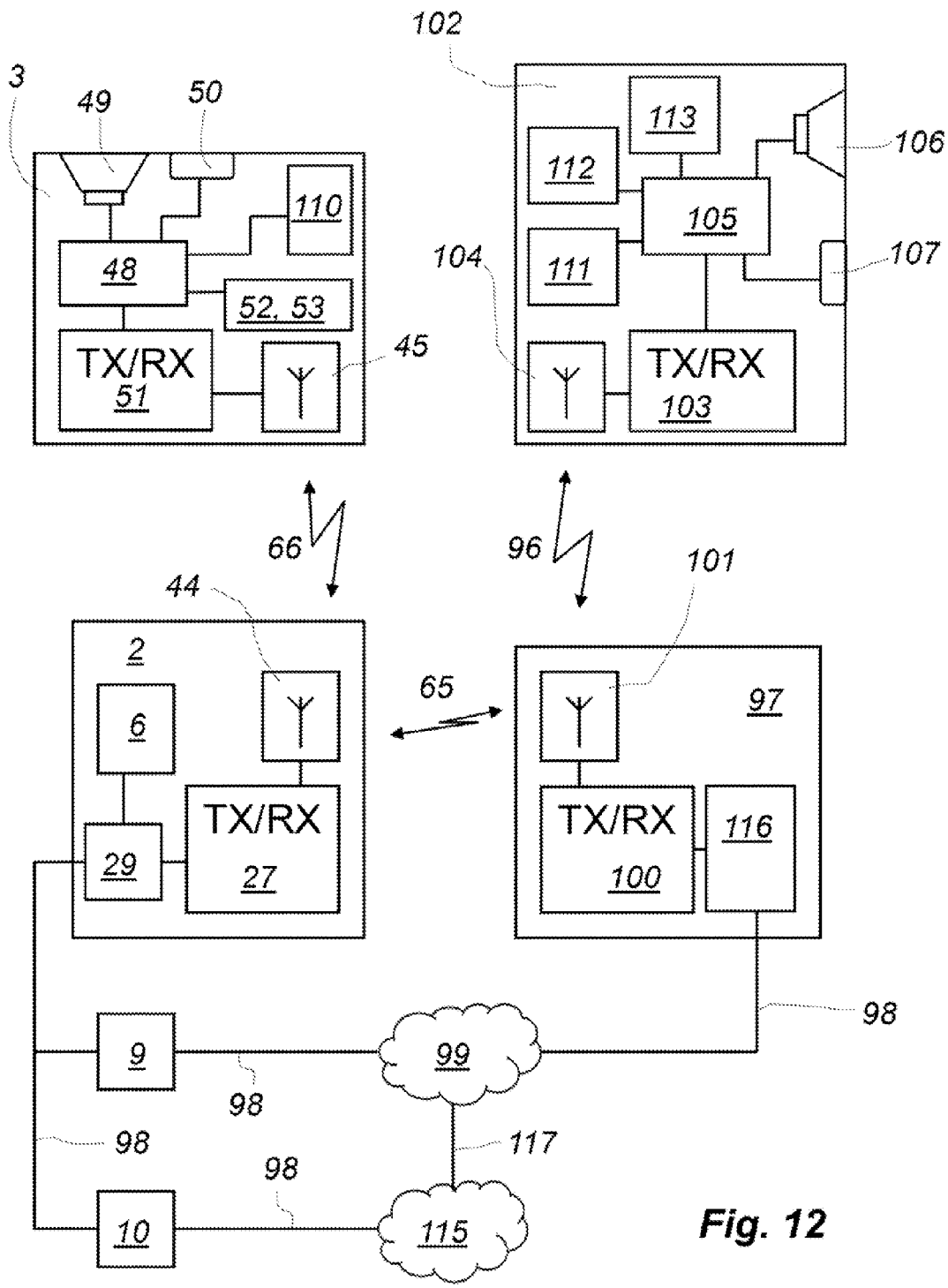
FIG. 12 is a diagram showing some of the main elements of the different parts of the telecommunication system according to a first embodiment.

FIG. 12 is a diagram showing some of the main elements of the different components of the telecommunication system 95 according to a first embodiment of the invention. The headset 3 comprises a speaker 50, a microphone 49, a processor 48, a headset transceiver 51, a headset antenna 45, a rechargeable battery 110 and a headset user interface 52, 53. The headset base unit 2 comprises a touch-screen display 6, a processor 29, a headset base transceiver 27 and a headset base antenna 44. The charging contacts 30 and other parts, which are not essential for the understanding of the invention, are left out for clarity reasons. Radio signals, which include voice and data, are transferred between the headset transceiver 51 and the headset base transceiver 27 via a first radio link 66, which follows the DECT standard. The headset base unit 2 is by means of cords 98 connected to a desk phone 9 and a personal computer 10. The desk phone 9 can be a standard corded desk phone which by means of cords 98 is connected to the public switched telephone network (PSTN) 99. The personal computer 10 is by means of cords 98 connected to the Internet and my comprise Internet Protocol telephony software or other communication software, which can be utilized by the headset system 1. As symbolized with the line 117, the public switched telephone network 99 is connected with the Internet 115, so that voice calls can be established between PSTN telephones and IP telephones. All the cords 98 can be replaced by radio links.

The handset 102 comprises a processor 105, a rechargeable battery 111, a handset user interface 112, a display 113, a speaker 106, a microphone 107, a handset transceiver 103 and a handset antenna 104. The handset user interface 112 comprises primarily buttons, so that the user can dial a number, choose a contact from an internal phone book, adjust speaker volume etc. The display 113 is typically used for showing caller ID or callee ID, different settings, battery level etc. The telephone base unit 97 comprises a telephone base transceiver 100, a telephone base processor 116 and a telephone base antenna 101. The handset 102 and the telephone base unit 97 communicate via a second radio link 96, when the handset 102 is removed from the telephone base unit 97. This radio link 96 follows the DECT standard, just like the first radio link 66 between the headset 3 and the headset base unit 2. The telephone base unit 97 is by means of a cord 98 connected to the public switched telephone network 99.

The headset base unit 2 and the telephone base unit 97 also communicate wirelessly via a third radio link 65, which follows the DECT standard link the first 66 and the second 96 radio link. As the three radio links 66, 96, 65 all follow the DECT standard and support the GAP-profile, only one headset base transceiver 27 is needed to allow radio communication with both the headset 3 and the telephone base unit 97. Normally, a DECT phone is configured with the phone base as a master and the handset as a slave. The base is also typically the master and the headset slave in wireless headset systems according to the DECT standard. A master can be wirelessly connected to several slaves, and a slave can be connected to more than one master. However, two masters can normally not be connected. Therefore, the headset base unit 2 is configured to act as a master in relation to the headset 3 and a slave in relation to the telephone base unit 97. This configuration can be obtained in different ways. According to the embodiment shown in FIG. 12, in which the headset base unit 2 only has one transceiver 27, the same transceiver 27 is configured to work simultaneously as a master and a slave. This is possible, if the transceiver chip is powerful enough and programmed accordingly. Therefore it is possible to move the interface from the master to the slave where it may be more accessible to the user.

Figure 13:
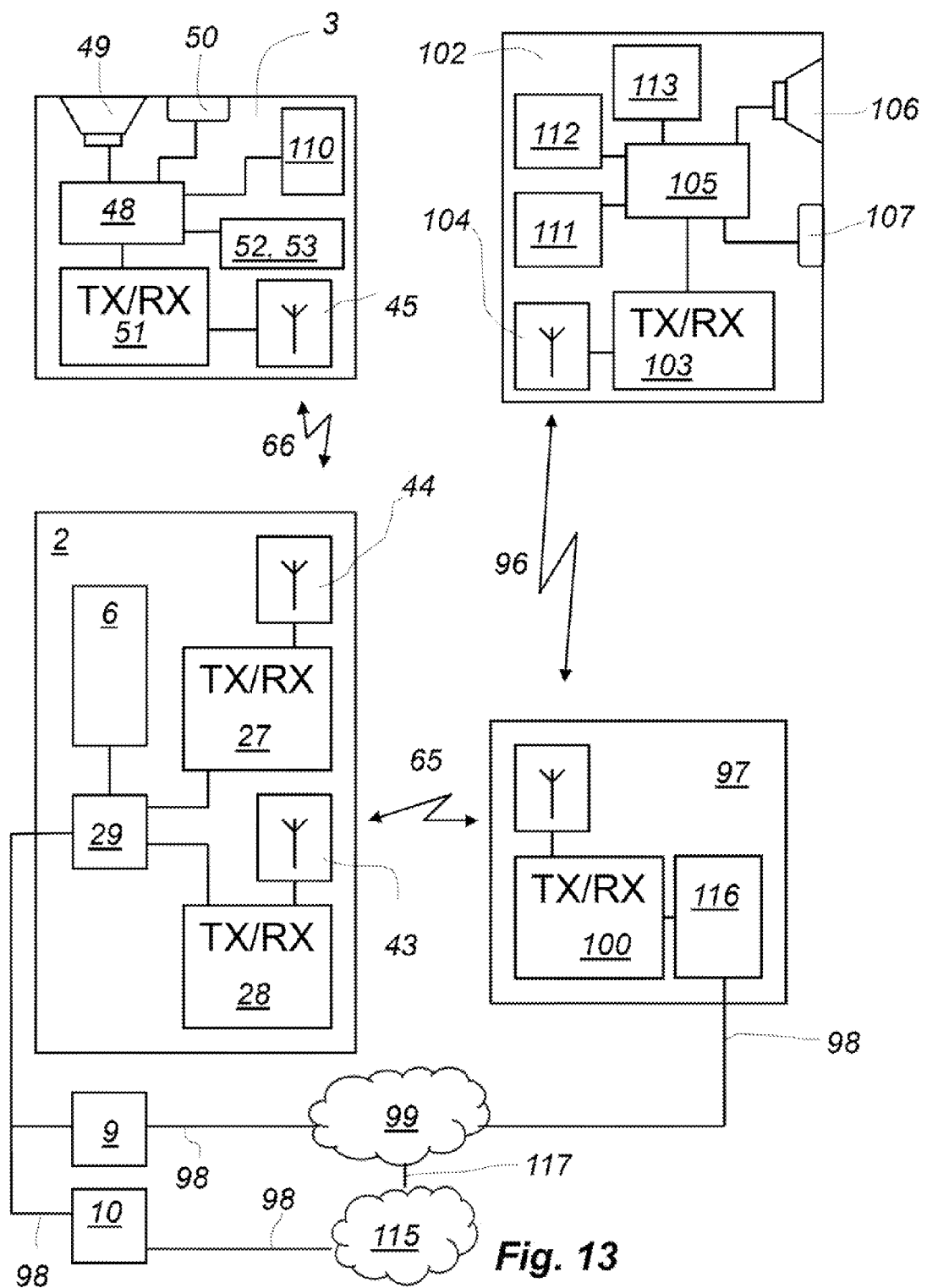
FIG. 13 is a diagram showing some of the main elements of the different parts of a second embodiment of a telecommunication system.

FIG. 13 discloses a second embodiment of a communication system 95 according to the invention. The second embodiment differs from the first embodiment by the headset base unit 2 comprising two separate transceivers 27, 28 and antennas 44, 43. The first headset base transceiver 27 and the first headset base antenna 44 communicate via the first radio link 66 with the headset 3. The second headset base transceiver 28 and the second headset base antenna 43 communicate via the third radio link 65 with the telephone base unit 97. In this embodiment, the first headset base transceiver 27 is master and the second headset base transceiver 28 is slave.

In the second embodiment shown in FIG. 13, each of the first and second headset base transceiver 27, 28 has an antenna.

In both embodiments shown here, a standard DECT telephone with a master transceiver in the base and a slave transceiver in the handset can be used. Thus, the user can easily replace his telephone if he wishes.

In the description above the, term "transceiver" is intended to mean a combination of a transmitter and a receiver in any physical embodiment. For example, the transmitter and the receiver can be combined in one chip or be two separate chips.

REFERENCE SIGNS 1 headset system
2 base
3 headset
4 base housing
5 headset holder
6 display
7 first connection device
8 second connection device
9 desk phone
10 PC
11 mobile phone
12 target phone icon
13 mobile phone icon
14 PC icon
15 headset icon
16 battery level icon
17 setup icon
18 first handset icon
19 second handset icon
20 on hold icon
21-23 icons for incoming call on same line
24 caller ID icon
25 on hold icon
26 on call icon
27 first base transceiver
28 second base transceiver
29 base processor
30 charging terminals
30a microphone arm
31 endpiece of headband
32 headset (second embodiment)
33 ear hook
34 earbud
35 bottom part of holder unit
36 receiving hole in base housing
37 recess for display device
38 headset holder unit (second embodiment)
39 display device
40 incoming call icon
41 on call icon
42 record icon
43-45 antennas
46 headset connection device
47 headset user interface
48 headset processor
49 headset speaker
50 headset microphone
51 headset transceiver
52 headset multifunction button
53 headset volume button
54 earphone housing
55 arrow
56 holder unit
57 arrow
58 arrow
59 first headband part
60 second headband part
61 headset housing (second embodiment)
62 swap icon
63, 64 wired connections
65 third radio link
66 first radio link (wireless connections)
67 call options icon
68, 69 first and second call collision icons
70 speaker volume icon
71 mute icon
72 start recording icon
73 exit icon
74 scroll down icon
75 scroll up icon
76 scroll bar
77 first adjustment icon
78 second adjustment icon
79 speaker volume meter icon
80 treble icon
81 normal icon
82 bass icon
83 setup wizard icon
84 reset configuration icon
85 desk phone icon
86 connect to a desk phone icon
87 yes icon
88 no icon
89 question icon
90 instruction icon
91 microphone level icon
92 back icon
93 next icon
94 headset system
95 communication system
96 second radio link
97 telephone base unit
98 wire
99 Public Switched Telephone Network
100 telephone base transceiver
101 telephone base antenna
102 handset
103 handset transceiver
104 handset antenna
105 handset processor
106 handset speaker
107 handset microphone
109 cordless telephone
110 headset battery
111 handset battery
112 handset user interface
113 handset display
114 handset holder
115 the Internet
116 telephone base processor
117 connection between PSTN and the Internet

The invention claimed is:

1. A headset base unit comprising
a base housing,
a headset holder for holding a headset,
a first connection device from which the headset base unit is connectable to at least one telecommunication device, by which the telecommunication device is selected from a group of a desk phone, a PC phone or a mobile phone,
a second connection device, from which the headset base unit is connectable to the headset,
a controller, configured to open an audio channel between the headset base unit and a selected one of the telecommunication devices,
a display unit with a display adapted for displaying device icons representing connected telecommunication devices and
wherein the display is a touch-screen display and wherein a telecommunication device can be selected by touching the device icon representing the telecommunication device and wherein the device icons change appearance in dependence on call status of the represented telecommunication device and wherein the headset base unit is simultaneously connectable to more than one telecommunication device and wherein said display shows a representation of each of said telecommunication devices on a screen with a further swap icon, so that a user may select which telecommunication device will be connected to the headset base unit, and wherein the headset holder is a part which is an adjustable or releasable part of the headset base unit; and wherein the headset holder is rotatable about an essentially vertical axis, while the headset is dockable thereon, when the headset base unit stands on an essentially horizontal surface.

2. The headset base unit according to claim 1, wherein the headset holder is arranged beside the display.

3. The headset base unit of claim 1, wherein the headset holder includes a portion extending generally orthogonally from said headset base unit and includes an arcuate portion of approximately one-fourth of a circle and including charging terminals thereon.

4. The headset base unit of claim 1, wherein at least one device icon changes appearance in dependence on call status of the represented telecommunication device.

5. The headset base unit of claim 1 including a second transceiver for wireless communication with a telecommunication terminal comprising a corresponding transceiver.

6. A headset base unit comprising
a base housing,
a headset holder for holding a headset,
a first connection device from which the headset base unit is connectable to at least one telecommunication device, by which the telecommunication device is selected from a group of a desk phone, a PC phone or a mobile phone,
a first transceiver, from which the headset base unit is connectable to the headset,
a controller, configured to open an audio channel between the headset base unit and a selected one of the telecommunication devices,
a display unit with a display adapted for displaying device icons representing connected telecommunication devices and wherein the display is a touch-screen display and wherein a telecommunication device can be selected by touching the device icon representing the telecommunication device and wherein the device icons change appearance in dependence on call status of the represented telecommunication device and wherein the headset base unit is simultaneously connectable to more than one telecommunication device and wherein said display shows a representation of each of said telecommunication devices on a screen with a further swap icon, so that a user may select which telecommunication device will be connected to the headset base unit, and wherein the headset holder is a part which is an adjustable or releasable part of the headset base unit; and wherein the headset base unit further includes a second transceiver for wireless communication with a telecommunication device.

7. The base unit of claim 6, wherein the headset holder is rotatable about an axis while the headset is dockable thereon.

8. The headset base unit of claim 6 wherein the headset holder is rotatable about an essentially vertical axis.

\* \* \* \* \*